United States Patent [19]

Sollner

[11] 4,224,206

[45] Sep. 23, 1980

[54] WATER SOLUBLE ESSENTIALLY LINEAR POLYMER HAVING A PLURALITY OF AMIDE, IMIDE AND ESTER GROUPS THEREIN, AND A METHOD OF MAKING THE SAME AND APPLYING THE SAME TO SUBSTRATES

[75] Inventor: George H. Sollner, Fort Wayne, Ind.

[73] Assignee: Phelps Dodge Industries, Inc., New York, N.Y.

[21] Appl. No.: 929,102

[22] Filed: Jul. 31, 1978

[51] Int. Cl.$^3$ .............................................. C08G 73/16
[52] U.S. Cl. ........................ 260/29.2 N; 260/29.2 E; 260/30.2; 260/32.4; 260/32.6 N; 260/33.4 P; 428/458; 428/480; 428/425.8; 525/180; 525/181; 525/183; 525/403; 525/406; 525/422; 528/128; 528/188; 528/189; 528/226; 528/228; 528/229; 528/288; 528/289; 528/290; 428/473.5
[58] Field of Search ............... 528/289, 226, 228, 229, 528/288, 290, 128, 188, 189; 428/474, 480, 458; 260/29.2 N, 29.2 E, 30.2, 32.4, 32.6 N, 33.4 P; 525/180, 181, 183, 403, 406, 422

[56] References Cited

U.S. PATENT DOCUMENTS

| | | | |
|---|---|---|---|
| 3,793,250 | 2/1974 | Schmidt et al. ...................... | 528/289 |
| 3,865,785 | 2/1975 | Pauze ................................... | 528/289 |
| 3,922,252 | 11/1975 | Holub et al. ......................... | 528/289 |
| 3,994,863 | 11/1976 | Kovacs et al. ....................... | 528/289 |

Primary Examiner—Lester L. Lee
Attorney, Agent, or Firm—David A. Lundy

[57] ABSTRACT

An essentially linear polymer having a plurality of amide, imide and ester groups therein, which is the condensation product of (1) at least one polycarboxylic acid imide-forming reactant, (2) at least one ethylenically unsaturated polycarboxylic acid carboxypyrrolidone-forming reactant, (3) at least one polycarboxylic acid ester-forming reactant, (4) at least one glycoly, (5) at least one other polyfunctional hydroxyl compound, and (6) at least one polyfunctional amino compound having at least one primary amine group thereon. The equivalent molar ratio of the functional hydroxyl groups of the glycols and hydroxyl compounds to the functional ester-forming carboxyl groups of the acid reactants is from about 1.0 to 1 to about 3.0 to 1. The equivalent molar ratio of the functional imide-forming groups of the acid reactants and the polyfunctional amino reactants and the functional carboxypyrrolidone-forming groups of the ethylenically unsaturated acid reactants and the polyfunctional amino reactants to the functional ester-forming carboxyl groups of the acid reactants is from about 0.2 to 1 to about 1.0 to 1. The equivalent molar ratio of said functional imide-forming groups of the acid reactants and the polyfunctional amino reactants to the functional carboxypyrrolidone-forming groups of the ethylenically unsaturated acid reactants and the polyfunctional amino reactants are from about 0.5 to 1 to about 3.0 to 1.

20 Claims, 1 Drawing Figure

WATER SOLUBLE ESSENTIALLY LINEAR POLYMER HAVING A PLURALITY OF AMIDE, IMIDE AND ESTER GROUPS THEREIN, AND A METHOD OF MAKING THE SAME AND APPLYING THE SAME TO SUBSTRATES

RELATED APPLICATIONS

This application is related to U.S. Pat. application Ser. No. 713,442 entitled "AN ESSENTIALLY LINEAR POLYMER HAVING A PLURALITY OF AMIDE, IMIDE AND ESTER GROUPS THEREIN AND A METHOD OF MAKING THE SAME" and filed on Aug. 11, 1976.

BACKGROUND OF THE INVENTION

This invention relates to a novel polymer, and to methods of making the same and applying the same to substrates. More particularly, the invention relates to the class of polymers which have a plurality of amide, imide and ester groups therein and are water soluble. Additionally, and more particularly, the invention relates to a magnet wire enamel, inasmuch as the novel polymer of the invention has all of the physical, mechanical, chemical and electrical properties of a good magnet wire insulation material.

Essentially linear polyester polymer materials have long been available. Such material have heretofore been used as magnet wire insulation materials. Both thermoplastic and thermosettable essentially linear polyester resin materials have been proposed. See for example:

| | |
|---|---|
| British Patent No. 978,717 | U.S. Pat. No. 3,293,248 |
| British Patent No. 1,115,919 | U.S. Pat. No. 3,297,785 |
| Canadian Patent No. 706,940 | U.S. Pat. No. 3,312,573 |
| Canadian Patent No. 781,993 | U.S. Pat. No. 3,342,780 |
| French Patent No. 1,416,443 | U.S. Pat. No. 3,390,131 |
| U.S. Pat. No. 2,268,586 | U.S. Pat. No. 3,428,426 |
| U.S. Pat. No. 2,333,639 | U.S. Pat. No. 3,445,477 |
| U.S. Pat. No. 2,686,739 | U.S. Pat. No. 3,446,758 |
| U.S. Pat. No. 2,691,006 | U.S. Pat. No. 3,448,089 |
| U.S. Pat. No. 2,889,304 | U.S. Pat. No. 3,480,589 |
| U.S. Pat. No. 2,936,296 | U.S. Pat. No. 3,489,696 |
| U.S. Pat. No. 3,022,200 | U.S. Pat. No. 3,518,219 |
| U.S. Pat. No. 3,141,859 | U.S. Pat. No. 3,518,230 |
| U.S. Pat. No. 3,179,634 | U.S. Pat. No. 3,553,215 |
| U.S. Pat. No. 3,201,276 | U.S. Pat. No. 3,576,774 |
| U.S. Pat. No. 3,211,585 | U.S. Pat. No. 3,578,639 |
| U.S. Pat. No. 3,240,626 | U.S. Pat. No. 3,699,082 |
| U.S. Pat. No. 3,249,578 | U.S. Pat. No. 3,790,530 |

Numerous polyamide polymers, polyamide-imide polymers and polyimide polymers have also been proposed. These polymers generally have better thermal properties than the polyester polymers but are appreciably more expensive than the polyester polymers. Thus, while these polymers have also been used as magnet wires materials, their use has been limited to applications which can tolerate the increase cost thereof. Such polymers have also been discovered; see for example:

| | |
|---|---|
| British Patent No. 570,858 | U.S. Pat. No. 3,347,828 |
| British Patent No. 627,205 | U.S. Pat. No. 3,445,477 |
| British Patent No. 810,489 | U.S. Pat. No. 3,451,848 |
| British Patent No. 1,009,956 | U.S. Pat. No. 3,471,444 |
| British Patent No. 1,060,159 | U.S. Pat. No. 3,472,815 |
| British Patent No. 1,155,230 | U.S. Pat. No. 3,475,212 |
| British Patent No. 1,160,097 | U.S. Pat. No. 3,485,796 |
| British Patent No. 1,168,978 | U.S. Pat. No. 3,489,696 |
| British Patent No. 1,171,242 | U.S. Pat. No. 3,493,540 |
| British Patent No. 1,175,555 | U.S. Pat. No. 3,509,106 |

*-continued*

| | |
|---|---|
| British Patent No. 1,217,041 | U.S. Pat. No. 3,518,219 |
| British Patent No. 1,220,590 | U.S. Pat. No. 3,518,230 |
| British Patent No. 1,234,252 | U.S. Pat. No. 3,539,537 |
| Canadian Patent No. 701,460 | U.S. Pat. No. 3,541,038 |
| French Patent No. 1,473,600 | U.S. Pat. No. 3,546,152 |
| U.S. Pat. No. 2,268,586 | U.S. Pat. No. 3,547,895 |
| U.S. Pat. No. 2,621,168 | U.S. Pat. No. 3,553,159 |
| U.S. Pat. No. 3,179,635 | U.S. Pat. No. 3,554,984 |
| U.S. Pat. No. 3,179,639 | U.S. Pat. No. 3,562,217 |
| U.S. Pat. No. 3,260,691 | U.S. Pat. No. 3,575,891 |
| U.S. Pat. No. 3,300,420 | U.S. Pat. No. 3,578,639 |
| U.S. Pat. No. 3,314,923 | U.S. Pat. No. 3,592,789 |
| | U.S. Pat. No. 3,696,077 |
| | U.S. Pat. No. 3,790,530 |

The demand for new polymers for use as magnet wire insulation materials which have higher and more reliable thermal life, while at the same time, are less expensive to manufacture and to apply than the polyamide-imide, and polyimide polymers continues. To meet this demand, there has been proposed several modified polyamide, polyimide and polyester polymer materials. For the most part, these materials are a polyimide-ester resin materials, polyimide-ester resin materials or polyamide-imide-ester resin materials. See for example:

| | |
|---|---|
| British Patent No. 1,242,715 | U.S. Pat. No. 3,425,866 |
| Canadian Patent No. 771,126 | U.S. Pat. No. 3,426,098 |
| U.S. Pat. No. 2,547,113 | U.S. Pat. No. 3,428,486 |
| U.S. Pat. No. 2,626,223 | U.S. Pat. No. 3,458,480 |
| U.S. Pat. No. 2,777,830 | U.S. Pat. No. 3,493,544 |
| U.S. Pat. No. 2,821,517 | U.S. Pat. No. 3,505,272 |
| U.S. Pat. No. 3,136,738 | U.S. Pat. No. 3,551,383 |
| U.S. Pat. No. 3,255,069 | U.S. Pat. No. 3,555,113 |
| U.S. Pat. No. 3,338,743 | U.S. Pat. No. 3,578,638 |
| U.S. Pat. No. 3,354,126 | U.S. Pat. No. 3,699,082 |
| U.S. Pat. No. 3,361,593 | U.S. Pat. No. 3,793,250 |
| U.S. Pat. No. 3,390,118 | |

In general, some such materials are thermoplastic, some are thermosettable materials, some are cross-linked thermoplastic materials and some are cross-linked thermosettable materials. For the most part all such materials contain both aliphatic and aromatic groups. In general, the linear polymers have more flexibility than the non-linear, cross-linked materials, and the totally aromatic polymers have a higher and more reliable thermal life, but are more expensive than the totally aliphatic polymers. Thus, each of the above-identified modified polyamide, polyester and polyimide polymers represent compromises in thermal life, cost, flexibility and other physical, mechanical, chemical and electrical properties.

In recent years, due to new and different applications of magnet wire, the demand for higher and more reliable thermal life has increased considerably. At the same time, the demand for lower cost and decreased processing time has also increased. It is therefore desirable to provide an improved magnet wire enamel having a higher and more reliable thermal life, and increased resistance to thermal overloads which at the same time has all of the required mechanical, physical, chemical and electrical properties required for most major uses as insulation material, which can be applied in an economical and rapid manner. It is also desirable that such a resin substantially comprise a polymer having ester, imide and amide groups therein since the inherent properties thereof are well known to manufacturers of insulated products.

In recent years, water soluble magnet wire insulation materials have also been proposed. The demand for water soluble insulation materials continues both because they are less expensive to apply than polymeric materials from solutions of other solvents, and do not require the elaborate pollution control devices that are now common place in American industry. See for example:

| | |
|---|---|
| U.S. Pat. No. 4,004,063 | U.S. Pat. No. 3,925,313 |
| U.S. Pat. No. 4,003,947 | U.S. Pat. No. 3,936,404 |
| U.S. Pat. No. 3,974,115 | U.S. Pat. No. 3,975,330 |
| | U.S. Pat. No. 3,014,832 |

It is therefore desirable to provide an improved magnet wire enamel having a higher and more reliable thermal life, an increased resistance to thermal overloads which at the same time has all of the required mechanical, physical, chemical and electrical properties required for most major uses as insulation material, which can be applied in an economical and rapid manner from a water solution and has a plurality of amide groups, imide groups and ester groups therein.

SUMMARY OF THE INVENTION

It is therefore the primary object of this invention to provide an improved magnet wire insulation material and a method of making the same and applying the same to substrates.

Another object of this invention is to provide an improved polymer having a plurality of amide, imide, and ester groups therein and a method of making the same and applying the same to substrates.

Another object of this invention is to provide an improved water soluble polymer having a plurality of amide, imide and ester groups therein and a method of making the same and applying the same to substrates.

Another object of this invention is to provide an improved water soluble polymer having a plurality of amide, imide and ester groups therein and all of the mechanical, physical, chemical and electrical properties required for most major uses as an insulation material, and a method of making the same and applying the same to substrates.

Another object of this invention is to provide an improved polymer having a plurality of amide, imide and ester groups therein and all of the mechanical, physical, and chemical and electrical properties required for most major uses as an insulation material, and a method of making the same and applying the same to substrates.

Another object of this invention is to provide an improved water soluble insulation material having a higher and more reliable thermal stability, and a method of making the same and applying the same to substrates.

Yet another object of this invention is to provide an improved water soluble insulation material having an increased resistance to thermal overloads, and a method of making the same and applying the same to substrates.

Yet another object of this invention is to provide an improved water soluble magnet wire insulation material comprising essentially a polymer having a plurality of amide, imide, and ester groups therein which can be applied to a copper or aluminum conductor in a more economical and rapid manner, and a method of making the same.

Yet another object of this invention is to provide an improved magnet wire insulation material comprising essentially a polymer having a plurality of amide, imide and ester groups therein which can be applied to a copper or aluminum conductor in a more economical and rapid manner and a method of making the same.

Yet another object of this invention is to provide an improved water soluble insulation material having higher and more reliable thermal stability and increased resistance to thermal overloads, that can be applied in a more economical and rapid manner, and a method of making the same.

Yet another object of this invention is to provide an improved insulation material having higher and more reliable thermal stability and increased resistance to thermal overloads, and a method of applying the same to substrates.

A further object of this invention is to provide an improved magnet wire enamel comprising an essentially linear polymer having a plurality of amide, imide and ester groups therein which has all of the mechanical, physical, chemical and electrical properties required for most uses of insulation materials, an improved and more reliable thermal stability and an increased resistance to thermal overloads, and improved methods of making the enamel and applying the same to substrates.

In the broader aspects of this invention, there is provided an essentially linear polymer having a plurality of amide, imide and ester groups therein, which is the condensation product of (1) at least one polycarboxylic acid imide-forming reactant, (2) at least one ethylenically unsaturated polycarboxylic acid carboxypyrrolidone-forming reactant, (3) at least one polycarboxylic acid ester-forming reactant, (4) at least one glycoly (5) at least one other polyfunctional hydroxyl compound, and (6) at least one polyfunctional amino compound having at least one primary amine group thereon. The equivalent molar ratio of the functional hydroxyl groups of the glycols and hydroxyl compounds to the functional ester-forming carboxyl groups of the acid reactants is from about 1.0 to 1 to about 3.0 to 1. The equivalent molar ratio of the functional imide-forming groups of the acid reactants and the polyfunctional amino reactants and the functional carboxypyrrolidone-forming groups of the ethylenically unsaturated acid reactants and the polyfunctional amino reactants to the functional ester-forming carboxyl groups of the acid reactants is from about 0.2 to 1 to about 1.0 to 1. The equivalent molar ratio of said functional imide-forming groups of the acid reactants and the polyfunctional amino reactants to the functional carboxypyrrolidone-forming groups of the ethylenically unsaturated acid reactants and the polyfunctional amino reactants are from about 0.5 to 1 to about 3.0 to 1. The method of making said polymer includes placing the reactants in a solvent of the reactants having a boiling point in excess of about 150° C., heating the reactants and solvent at atmospheric pressure from about 100° C. to about 300° C. until the reaction product has an acid number from about 10 to about 200. The method of applying the polymer to a substrate includes diluting the polymer with water and a volatile base. The resulting polymer solution then can be applied as a coating utilizing conventional organo metallic compounds as catalysts. In specific embodiments, surface active flow control agents and pre-polymeric cross linker and/or chain extender materials may be added to the polymer solution prior to use as is conventional.

BRIEF DESCRIPTION OF THE DRAWINGS

The above mentioned and other features and objects of this invention and the manner of attaining them will become more apparent and the invention itself will be best understood by reference to the following description of the invention taken in conjunction with the accompanying drawings wherein.

DESCRIPTION OF A SPECIFIC EMBODIMENT

Figure 1:
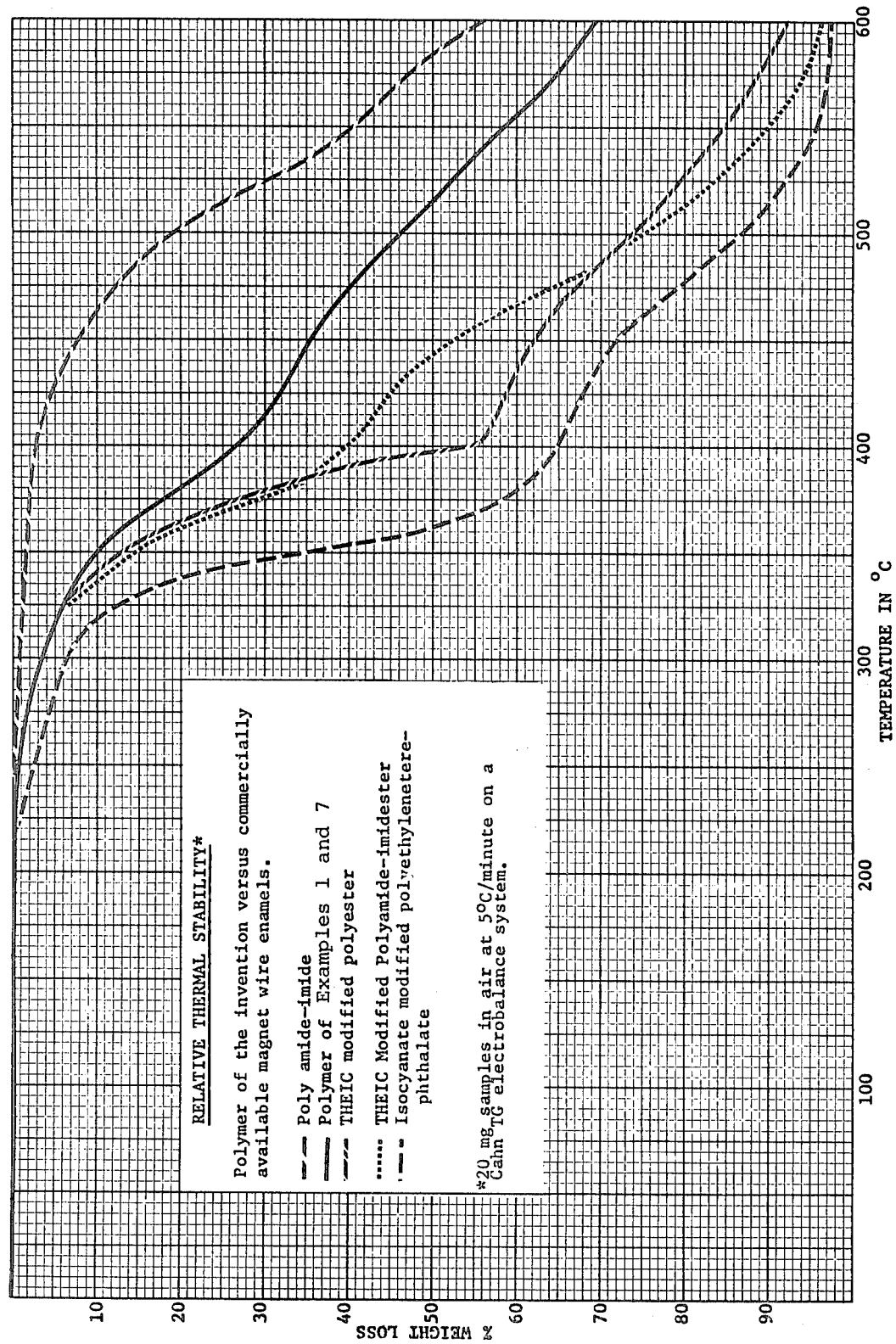
FIG. 1 is a comparison of the relative thermal stability of the polymer of the invention and prior art polymers.

The polymer of the invention is an essentially linear polymer having a plurality of amide, imide and ester groups therein which has all of the chemical, physical and electrical properties of a good insulation material and which can be applied to both copper and aluminum conductors as magnet wire insulation in a more economical and rapid manner than prior art insulation materials having improved thermal stability characteristics and resistance to thermal overloads.

The improved polymer of the invention is essentially the condensation product of an essentially linear polymer havng a plurality of amide, imide and ester groups therein, which is the condensation product of (1) at least one polycarboxylic acid imide-forming reactant, (2) at least one ethylenically unsaturated polycarboxylic acid carboxypyrrolidone-forming reactant, (3) at least one polycarboxylic acid ester-forming reactant, (4) at least one glycol, (5) at least one other polyfunctional hydroxyl compound, (6) at least one polyfunctional amino compound having at least one primary amine group thereon. The equivalent molar ratio of the functional hydroxyl groups of the glycols and hydroxyl compounds to the functional ester-forming carboxyl groups of the acid reactants is from about 1.0 to 1 to about 3.0 to 1. The equivalent molar ratio of the functional imide-forming groups of the acid reactants and the polyfunctional amino reactants and the functional carboxypyrrolidone-forming groups of the ethylenically unsaturated acid reactants and the polyfunctional amino reactants to the functional ester-forming carboxyl groups of the acid reactants is from about 0.2 to 1 to about 1.0 to 1. The equivalent molar ratio of said functional imide-forming groups of the acid reactants and the polyfunctional amino reactants to the functional carboxypyrrolidone-forming groups of the ethylenically unsaturated acid reactants and the polyfunctional amino reactants are from about 0.5 to 1 to about 3.0 to 1. The method of making said polymer includes placing the reactants in a solvent of the reactants having a boiling point in excess of about 150° C., heating the reactants and solvent at atmospheric pressure from about 100° C. to about 300° C. until the reaction product has an acid number from about 10 to about 200. The method of applying the polymer to a substrate includes diluting the polymer with water and a volatile base. The resulting polymer solution then can be applied as a coating utilizing conventional organo metallic compounds as catalysts. In specific embodiments, surface active flow control agents and pre-polymer cross linker and/or chain extender materials may be added to the polymer solution prior to use as is conventional.

These reactants are placed in solution and reacted in the presence of a condensation catalyst in accordance with the method of making the polymer of the invention which will be described hereinafter.

The term "polycarboxylic acid carboxypyrrolidone-forming reactant" is used herein to refer to those polycarboxylic acid reactants which are ethylenically unsaturated and form a carboxypyrrolidone when reacted with a primary amine. Both aromatic and aliphatic acids can be used. However, primarily because of their availability, aliphatic carboxylic acid reactants are preferred. Examples of such polycarboxylic acid carboxypyrrolidone-forming reactants include itaconic and aconitic acids.

The term "polycarboxylic acid imide-forming reactants" is used herein to include those polycarboxylic acid reactants which when reacted with an amine, isocyanate or other reactive functional groups forms a five member imide ring. In general, these carboxylic acid reactants are those which have two adjacent carboxylic acid functional groups and their anhydrides. Both aromatic and aliphatic carboxylic acid reactants can be used. Examples of polycarboxylic acid imide-forming reactants include trimellitic acid; pyrromellitic acid; benzophenone 2, 3, 2', 3', tetracarboxylic acid; 2, 3, 6, 7 napthalene tetracarboxylic acid; 3, 3', 4, 4'diphenyltetracarboxylic acid; and other known tetracarboxylic acids having two or more benzene nuclei, and the dianhydrides thereof.

The term "polycarboxylic acid ester-forming reactant" is used herein to refer to the polycarboxylic acids and esters, aryl halides, alkyl esters and anhydrides thereof which are useful in the invention. Polycarboxylic acid ester-forming reactants which are useful in the invention also can be aromatic or aliphatic. The most useful polycarboxylic acid ester-forming reactants are terephthalic, isophthalic, benzophenone dicarboxylic, phthalic, succinic and trimellitic acids, and esters, aryl halides, alkyl esters, and anhydrides thereof. Other known polycarboxylic acids having two or more benzene nuclei are also useful in the invention.

The term "polyfunctional amino reactant" is used herein to refer to those amine compounds which when reacted with a polycarboxylic acid carboxypyrrolidone-forming reactant and a polycarboxylic acid imide-forming reactant results in the formation of a five or six member lactam ring and a five member imide ring, respectively. While any such amine compound having at least one primary amine group thereon is useful; the essentially linear diamines are preferred as will be mentioned hereinafter. Both aromatic and aliphatic amino compounds are useful in the invention. Examples of polyfunctional amino reactants useful in the invention include: methylene dianaline; benzidene; 3, 3' diamino diphenyl; 1, 4 diamino naphthalene; p-phenylene diamine; $\alpha, \omega$, nonamethylene diamine; 4, 4' diamino diphenylether; 4, 4' dimethyl heptamethylene diamine; 1, 7 diamino diphenyl ketone; bis (4-amino phenyl) $\alpha, \alpha'$, p-xylene, m-phenylene diamine; xylene diamine; hexamethylene diamine; ethylene diamine; decacyclohexylmethane diamine; diamino diphenyl sulfone; diamino diphenyl sulfoxide; all diamines having three benzene nuclei; monoethanol amine; monopropanol amine; and amino carboxylic acid such as glycine, amino proprionic acid, amino caproic acid, amino benzoic acid.

The terms "glycol" and "polyfunctional hydroxyl compound" are also used herein for a certain class of reactants. The term "glycol" is used herein to refer to linear aliphatic diols having terminal hydroxyl groups. The term "polyfunctional hydroxyl compound" includes all glycols but further includes both aliphatic and aromatic alcohols, diols, and triols. Examples of polyfunctional hydroxyl compounds useful in the invention include: ethylene glycol; glycerin; pentaerythrytol; 1, 1, 1 trimethylol ethane; 1, 1, 1 trimethylol propane; zorbitol; manitol; dipentaerylthritol; α, ω, aliphatic hydrocarbon diols having four to five carbon atoms such as 1, 4butane diol; 1, 5 pentane glycol; neopentylene glycol; 1, 4 butene-2-diol, propylene glycol; cyclic glycols such as 2, 2, 4, 4, tetramethyl 1, 3 cyclobutane diol and tris (2 hydroxy ethyl) isocyanurate; hydroquinone dibetahydroxy ethyl ether; 1, 4, cyclohexane dimethylol; polyethylene glycol, polytetramethylene oxide glycol.

The term "soluble of the reactants" is used herein for a certain class of solvents in which both the reactants and the polymer of the invention are soluble under reaction conditions. The most desirable solvent is n-methyl-2-pyrrolidone which can either be used alone or in combinations with relatively poorer solvents such as the glycol ethers, glycol ether acetates and higher boiling ketones or other petroleum base diluents. While the "solvent of the reactants" is preferably n-methyl-2-pyrrolidone and the reaction solution preferably comprises about 90% solids and 10% solvent, the reaction of the solution of the invention can comprise larger amounts of solvents and the "solvent of the reactants" can be totally comprised of the "poorer" solvents such as glycol ethers, glycol ether acetates, and higher boiling ketones.

It is essential that the polymer of the invention have both aromatic and aliphatic groups therein. It is however preferred that the polymer of the invention when used as an insulation material in competition with prior art polymers have ester, imide and amide groups therein, be predominantly aromatic because of the greater thermal stability of the aromatic groups. Inasmuch as the polyfunctional hydroxyl compound and glycol reactant are more readily available as aliphatic reactants, the polycarboxylic acid reactants and the polyfunctional amino reactants are preferred to be aromatic.

Similarly, inasmuch as the polymer of the invention when used as an insulation material is preferably essentially linear, the polyfunctional amino reactant and the polyfunctional hydroxyl compound are preferably predominantly linear. However, the polymer of the invention may have a certain amount of cross linking through the amino, hydroxyl, carboxyl and other like functional groups; and in a specific embodiment, at least a portion of the polyfunctional hydroxyl compound is a compound having three or more hydroxyl groups. Also in a specific embodiment, prepolymeric materials such as cross linkers and/or chain extenders may be added to the reaction product prior to applying the same to a substrate, as is conventional. The more useful cross linkers and/or chain extenders include phenol-formaldahyde resins, amino plast resins, epoxy resins, and acrylic resins.

Besides the linearity and the aromaticity or the lack thereof of the specific reactants used, the amounts of the various reactants used to form a polymer of the invention are critical. To achieve a polymer having the desired properties, as above mentioned, various equivalent molar ratios of the functional groups of the reactants must not be exceeded. Also, various minimal equivalent molar ratios must be exceeded. The term "equivalent molar ratio" as used herein is calculated in accordance with the following formula:

$$\frac{\text{Moles } A \times \text{functionality of } A}{\text{Moles } B \times \text{functionality of } B}$$

It should be understood that the functional groups in the foregoing reactants are the carboxyl, hydroxyl, amino and like groups. Therefore, the dicarboxylic acid compounds, the diols, and the diamines, will be bi-functional while the functionality of an alchol having three or more hydroxyl groups will be equal to the particular number of hydroxyl groups in that compound. The carboxyl groups are divided between the "imide-forming", "ester-forming", and "carboxypyrrolidone-forming" carboxyl groups. Each of the reactants above listed have one or more of these functional groups.

Again referring to the polymer of the invention, used as an insulation material in competition with prior art polymers having ester imide and amide groups therein, the equivalent molar ratio of the functional hydroxyl groups of the glycols and the polyfunctional hydroxyl compounds to the functional ester-forming carboxyl groups of the acid reactants should be from about 1.0 to 1 to about 3.0 to 1, and preferably within the range of from about 1.1 to 1 to about 2.0 to 1. The water solubility of the polymer of the invention with a ratio below about 1.1 to 1 is less than desired. The water solubility of the polymer is an important feature of the invention when the polymer of the invention is used as a magnet wire insulation material, as above mentioned. The polymer of the invention with a ratio above about 2.0 to 1, results in a polymer which is cross-linked more than desirable for a magnet wire insulation material. Such a polymer has less than the desired flexibility and produces a film which has lower quality than desired.

Similarly, the polymer of the invention desirably has an equivalent molar ratio of the functional imide-forming groups of said polycarboxylic acid reactants and said polyfunctional amino reactants to the functional carboxypyrrolidone-forming groups of the ethylenically unsaturated acid reactants and the polyfunctional amino reactants is from about 0.5 to 1 to about 3.0 to 1. The polymer of the invention having an equivalent molar ratio below 0.5 to 1 has a lower thermal stability than desired as the thermal stability of the five member imide ring is diluted by the lower thermal stability of the other polymeric groups in the polymer. The polymer of the invention having an equivalent molar ratio above 3.0 to 1 has more plastic flow at elevated temperatures and thus a lower "cut through" than desired. Preferably, the polymer of the invention used as a magnet wire insulation material should have an equivalent molar ratio from about 1.1 to 1 to about 2.5 to 1.

Similarly, the equivalent molar ratio of the imide forming groups of the acid reactants and said polyfunctional amino reactants and the functional carboxypyrrolidone-forming groups of said ethylenically unsaturated and reactants and said polyfunctional amino reactants to the functional ester-forming groups of said acid reactants should be greater than about 0.2 to 1 and less than about 1.0 to 1 in a polymer of the invention. A polymer having an equivalent molar ratio greater than about 1.0 to 1 has less flexibility and less "cut through" than desired for a magnet wire insulation material. A polymer having an equivalent molar ratio less than about 0.2 to 1 does not have the required thermal properties of a magnet wire insulation material as measured by NEMA "OFM" and "heat shock". Preferably, the polymer of the invention used as magnet wire insulation material has a ratio from about 0.26 to 1 to about 0.5 to 1.

The various properties above-mentioned are determined by test procedures standardized by the Magnet Wire Section of the National Electrical Manufacturers Association as published in Standards Publication No. MW1000-173, National Electrical Manufacturers Association (1973).

Both the adherence of the magnet wire insulation to a substrate and the flexibility thereof are measured by a test referred to herein as "snap/snap-flex". This test is conducted in accordance with the procedure in paragraph 2.1, Standards Publication No. MW1000-173, part 3 (1973).

The thermal properties of the polymer of the invention are tested by tests referred to herein as "heat shock", NEMA "OFM", and "cut through" and "pyrolytic degradation". Each of these tests deal with a different thermal property: "heat shock" is indicative of the ability of the polymer to withstand changes of temperature under stress; NEMA "OFM" is indicative of the resistance to thermal overloads of the polymer at the rated temperature; and "cut through" is indicative of the degree of plasticity of the polymer at elevated temperatures.

The test procedure for: "heat shock" is found in paragraph 4.1; NEMA "OFM" is found in paragraph 53.1; "cut through" is found in paragraph 50.1, Standards Publication No. MW1000-173, part 3 (1973). "Relative thermal stability" is determined by heating samples of the polymer in air at a given rate on a Cahn TG electrobalance system.

The electrical properties of the polymer are also tested. The "dielectric breakdown" as referred to herein is conducted by the test procedure found in paragraph 7.1, Standards Publication No. MW1000-173, Part 3 (1973).

The following examples are presented herein to more fully illustrate the present invention. While specific reactions, reactants, and reaction products are described in these examples, it should be understood that each of the above generically identified reactants can be reacted in accordance with the invention disclosed herein to produce a polymer of the invention. Even within the prescribed ratios of reactants listed above, a variety of reactions and reaction products are possible; it being well within the skill of persons skilled in the art to formulate polymers of the invention in accordance therewith.

EXAMPLE 1

110.0 grams of dimethyl isophthalate, 39.0 grams of ethylene glycol, 84.0 grams of trimethylol propane, and an appropriate condensation catalyst were charged into a reaction vessel equipped with a stirrer, a vapor trap and heating element. The mass was heated to about 200° C. and maintained at that temperature until about 36.0 grams of distillate had been collected. The distillate began forming at about 175° C. 100.0 grams of n-methyl pyrrolidone, 99.0 grams of methylene dianiline, and 45.0 grams of itaconic acid were added to the reaction vessel. The mass was carefully held at a temperature of about 130° C. Then, 125.5 grams of trimellitic anhydride was added along with a conventional organometallic catalyst. The mixture was reheated carefully to about 220° C. The pressure within the reaction vessel was maintained at atmospheric pressure. After about two hours and half approximately 36.0 grams of distillate was collected. The temperature was then reduced to about 180° C. and 34.0 grams of phthalic anhydride was added to the reaction mixture. The temperature of the reaction mixture was held at about 180° C. until an acid number of about 27.8 was reached. At this time, 200.0 grams of ethylene glycol monobutyl ether was added along with 30.0 grams of dimethyl monoethanol amine, 557.0 grams of distilled water, and an appropriate amount of a conventional organo-metallic catalyst. The PH of the solution was adjusted to about 7.47 with dimethyl monoethanol amine. The resultant polymer solution comprises approximately 34% weight solids and 66% weight solvent. The solvent being approximately 65% water.

The resultant polymer solution was then applied to a bare copper conductor having no insulation thereon employing dies in a conventional wire coating tower at 36 feet per minute, having temperatures of 575° F., 650° F. and 825° F., respectively. Six coats were applied in this manner. The properties of the resultant magnet wire are shown in Table I.

EXAMPLE 2

145.5 grams of dimethyl isophthalate, 99.2 grams of ethylene glycol, 46.9 grams of trimethylol propane, and an appropriate condensation catalyst were charged into a reaction vessel equipped with a stirrer, a vapor trap and heating element. The mass was heated to about 200° C. and maintained at that temperature until about 48.0 grams of distillate had been collected. The distillate began forming at about 175° C. 100.0 grams of n-methyl pyrrolidone, 99.0 grams of methyline dianiline, and 45.0 grams of itaconic acid were added to the reaction vessel. The mass was carefully held at a temperature of about 130° C. Then, 125.0 grams of trimellitic anhydride was added along with a conventional organometallic catalyst. The mixture was reheated carefully to about 220° C. The pressure within the reaction vessel was maintained at atmospheric pressure. After about two hours and half approximately 36.0 grams of distillate was collected. The temperature was then reduced to about 180° C. and 57.6 grams of phthalic anhydride was added to the reaction mixture. The temperature of the reaction mixture was held at about 180° C. until an acid number of about 63 was reached. At this time, 200.0 grams of ethylene glycol monobutyl ether was added along with 85.0 grams of dimethyl monoethanol amine, 550.0 grams of distilled water, and an appropriate amount of a conventional organo-metallic catalyst. The PH of the solution was adjusted to about 7.50 with dimethyl monoethanol amine. The resultant polymer solution comprises approximately 34% weight solids and 66% weight solvent. The solvent being approximately 65% water.

The resultant polymer solution was then applied to a bare copper conductor having no insulation thereon employing dies in a conventional wire coating tower at 36 feet per minute, having temperatures of 575° F., 650° F. and 825° F., respectively. Six coats were applied in this manner. The properties of the resultant magnet wire are shown in Table I.

EXAMPLE 3

45.0 grams of dimethyl isophthalate, 32.0 grams of ethylene glycol, 70.0 grams of trimethylol propane, and an appropriate condensation catalyst were charged into a reaction vessel equipped with a stirrer, a vapor trap and heating element. The mass was heated to about 200°

C. and maintained at that temperature until about 15.0 grams of distillate had been collected. The distillate began forming at about 175° C. 100.0 grams of n-methyl pyrrolidone, 129.1 grams of methylene dianiline, and 68.0 grams of itaconic acid were added to the reaction vessel. The mass was carefully held at a temperature of about 130° C. Then, 150.0 grams of trimellitic anhydride was added along with a conventional organometallic catalyst. The mixture was reheated carefully to about 200° C. The pressure within the reaction vessel was maintained at atmospheric pressure. After about two hours and half approximately 46.0 grams of distillate was collected. The temperature was then reduced to about 180° C. and 34.0 grams of phthalic anhydride was added to the reaction mixture. The temperature of the reaction mixture was held at about 180° C. until an acid number of about 40 was reached. At this time, 200.0 grams of ethylene glycol monobutyl ether was added along with 30.0 grams of dimethyl monoethanol amine, 576.0 grams of distilled water, and an appropriate amount of a conventional organo-metallic catalyst. The PH of the solution was adjusted to about 7.50 with dimethyl monoethanol amine. The resultant polymer solution comprises approximately 34% weight solids and 66% weight solvent. The solvent being approximately 66% water.

The resultant polymer solution was then applied to a bare copper conductor having no insulation thereon employing dies in a conventional wire coating tower at 36 feet per minute, having temperatures of 575° F., 650° F. and 825° F., respectively. Six coats were applied in this manner. The properties of the resultant magnet wire are shown in Table I.

EXAMPLE 4

110.0 grams of dimethyl isophthalate, 39.0 grams of ethylene glycol, 84.0 grams of trimethylol propane, and an appropriate condensation catalyst were charged into a reaction vessel equipped with a stirrer, a vapor trap and heating element. The mass was heated to about 200° C. and maintained at that temperature until about 36.0 grams of distillate had been collected. The distillate began forming at about 175° C. 100.0 grams of n-methyl pyrrolidone, 99.0 grams of methylene dianiline, and 77.0 grams of itaconic acid were added to the reaction vessel. The mass was carefully held at a temperature of about 130° C. Then, 77.0 grams of trimellitic anhydride was added along with a conventional organometallic catalyst. The mixture was reheated carefully to about 220° C. The pressure within the reaction vessel was maintained at atmospheric pressure. After about two hours and half approximately 36.0 grams of distillate was collected. The temperature was then reduced to about 180° C. and 34.0 grams of phthalic anhydride was added to the reaction mixture. The temperature of the reaction mixture was held at about 180° C. until an acid number of about 60 was reached. At this time, 200.0 grams of ethylene glycol monobutyl ether was added along with 30.0 grams of dimethyl monoethanol amine, 540.0 grams of distilled water, and an appropriate amount of a conventional organo-metallic catalyst. The PH of the solution was adjusted to about 7.50 with dimethyl monoethanol amine. The resultant polymer solution comprises approximately 34% weight solids and 66% weight solvent. The solvent being approximately 64% water.

The resultant polymer solution was then applied to a bare copper conductor having no insulation thereon employing dies in a conventional wire coating tower at 36 feet per minute, having temperatures of 575° F., 650° F. and 825° F., respectively. Six coats were applied in this manner. The properties of the resultant magnet wire are shown in Table I.

EXAMPLE 5

110.0 grams of dimethyl isophthalate, 39.0 grams of ethylene glycol, 84.0 grams of trimethylol propane, and an appropriate condensation catalyst were charged into a reaction vessel equipped with a stirrer, a vapor trap and heating element. The mass was heated to about 200° C. and maintained at that temperature until about 36.0 grams of distillate had been collected. The distillate began forming at about 175° C. 100.0 grams of n-methyl pyrrolidone, 99.0 grams of methylene dianiline, and 35.0 grams of itaconic acid were added to the reaction vessel. The mass was carefully held at a temperature of about 130° C. Then, 140.0 grams of trimellitic anhydride was added along with a conventional organometallic catalyst. The mixture was reheated carefully to about 220° C. The pressure within the reaction vessel was maintained at atmospheric pressure. After about two hours and half approximately 36.0 grams of distillate was collected. The temperature was then reduced to about 180° C. and 34.0 grams of phthalic anhydride was added to the reaction mixture. The temperature of the reaction mixture was held at about 180° C. until an acid number of about 90 was reached. At this time, 200.0 grams of ethylene glycol monobutyl ether was added along with 30.0 grams of dimethyl monoethanol amine, 610.0 grams of distilled water, and an appropriate amount of a conventional organo-metallic catalyst. The PH of the solution was adjusted to about 7.50 with dimethyl monoethanol amine. The resultant polymer solution comprises approximately 34% weight solids and 66% weight solvent. The solvent being approximately 67% water.

The resultant polymer solution was then applied to a bare copper conductor having no insulation thereon employing dies in a conventional wire coating tower at 36 feet per minute, having temperatures of 575° F., 650° F. and 825° F., respectively. Six coats were applied in this manner. The properties of the resultant magnet wire are shown in Table I.

The method of making a polymer of the invention includes placing (1) at least one polycarboxylic acid imide-forming reactant, (2) at least one ethylenically unsaturated polycarboxylic acid carboxypyrrolidone-forming reactant, (3) at least one polycarboxylic acid ester-forming reactant, (4) at least one glycol, (5) at least one other polyfunctional hydroxyl compound, and (6) at least one polyfunctional amino compound having at least one primary amine group thereon, in a solvent of the reactants having a boiling point in access of about 150° C. As above described, the amounts of these various reactants are chosen such that the equivalent molar ratio of the functional hydroxyl groups of the glycols and hydroxyl compounds to the functional ester-forming carboxyl groups of the acid reactants is from about 1.0 to 1 to about 3.0 to 1, the equivalent molar ratio of the functional imide-forming groups of the acid reactants and the polyfunctional amino reactants and the functional carboxypyrrolidone-forming groups of the ethylenically unsaturated acid reactants and the polyfunctional amino reactants to the functional ester-forming carboxyl groups of the acid reactants is from about 0.2 to 1 to about 1.0 to 1, and the equivalent molar ratio of the functional imide-forming groups of the acid reactants and the polyfunctional amino reactants to the functional carboxy pyrrolidone-forming groups of the ethylenically unsaturated acid reactants and the polyfunctional amino reactants are from about 0.5 to 1 to about 3.0 to 1. The preferred ratios are also mentioned hereinabove.

The reactant solution is then heated at atmospheric pressure from about 100° C. to about 300° C. until the reaction product has an acid number from about 10 to about 200. While the examples teach reacting the ester-forming reaction first, the carboxyl pyrrolidone-forming reaction second and the imide-forming reaction third, this technique is used only to control the reaction and to achieve the best yields. The controlability of the reaction is for the most part dependent upon the reaction equipment used.

While the reaction can be carried out at temperatures from about 100° C. to about 300° C. at atmospheric pressure, the examples also teach that preferable reaction temperatures are from about 130° C. to about 225° C. At these temperatures, the best combination of controlability and reaction yields are achieved.

The reaction is terminated when the reaction product has an acid number from about 10 to about 200. The acid number of the reaction product is critical to the invention. If the polymer of the invention has an acid number less than about 10, the polymer of the invention does not have the desired solubility in water. If the acid number of the polymer of the invention is above 200, the physical and electrical properties of the cured film deteriorate to values less than that desired. For the polymer of the invention to have acceptable properties for a magnet wire insulation material, the acid number should be between about 20 and about 100.

The method of applying the polymer of the invention to a substrate includes diluting the polymer with water and a volatile base. The term "volatile base" is well known in the art. Volatile bases which are useful in the invention include ammonia, ammonium hydroxide and aliphatic amines containing less than 7 carbon atoms. The most desirable volatile bases for use with the invention are ammonium hydroxide and n n'-diethylethanol amine.

The method of the invention also includes applying the polymer solution to a substrate and evaporating the solvent therefrom and curing the polymer. In the examples of the invention, the polymer solution of the invention was diluted to a polymer solution having a percent weight solids from about 30% to about 40% solids. Additionally, the resultant polymer solution can be applied to conductors by using conventional wire coating towers.

Table I shows the physical, mechanical, chemical and electrical properties of the polymers of the invention made in accordance with the examples hereinabove, applied to a bare 18 AWG copper conductor having no insulation thereon and tested in accordance with the above-identified test procedures approved by the National Electrical Manufacturers Association. The properties of the polymer of the invention are indicated in Table I together with the properties of commercially accepted insulation materials made in accordance with the teaching of U.S. Pat. No. 3,793,250 referenced hereinabove and U.S. Pat. application Ser. No. 713,442 entitled AN ESSENTIALLY LINEAR POLYMER HAVING A PLURALITY OF AMIDE, IMIDE AND ESTER GROUPS THEREIN AND A METHOD OF MAKING THE SAME filed Aug. 11, 1976 and assigned to the same assignee as this application. These insulation materials were made in accordance with the following procedures:

EXAMPLE 6

46.0 grams of ethylene glycol, 79.0 grams of trimethylol propane, 198.0 grams of methylene dianiline, 250.0 grams of trimellitic anhydride, 90.0 grams of itaconic acid, and 145.0 grams of commercial cresylic acid were placed in a reaction vessel equipped with a stirrer, a vapor trap, and heating equipment. The mass was heated carefully to 150° C. At this temperature, a yellow precipitate formed. 7.0 grams of a 10% solution of tetrabutyltitanate in commercial cresylic acid was added and the mass was further heated to 220° C. until 67 milliliters of distillite was removed. Then, 341.0 grams of commercial cresylic acid and 65.0 grams of a 10% solution of a tetrabutyl titanate were added to the mass and the mass was held at 140° C. for about 1 hour. The resulting polymer was diluted with commercial cresylic acid and an aromatic hydrocarbon diluent to a final solution consisting of 30% weight solids and 70% weight solvent, the solvent having a solvent to diluent ratio of 60 to 40.

The polymer was then applied to a bare copper conductor having no insulation thereon employing dies and a conventional wire coating tower at 36 feet per minute having back temperatures of 620° F., 800° F., and 850° F., respectively. Six coats were applied in this manner.

EXAMPLE 7

50.8 grams of ethylene glycol, 87.1 grams of trimethyol propane, 145.5 grams of dimethyl isophthalate were placed in a reaction vessel equipped with a stirrer, a vapor trap, and heating equipment. The mass was heated to 200° C. and maintained at that temperature until 58 milliliters of distillate were removed from the trap. 100 grams of commercial cresylic acid, 99.0 grams of methylene dianiline, 45.0 grams of itaconic acid, and 125.0 grams of trimellitic acid anhydride were then added to the reaction vessel. The mass was carefully reheated to 220° C. The pressure in the reaction vessel was maintained at atmospheric pressure. When the temperature reached about 150° C., a conventional condensation catalyst was added to the reaction vessel. After 2 hours and 30 minutes of reaction at 220° C., the reaction solution was diluted with commercial cresylic acid and a minor portion of an aromatic hydrocarbon diluent, resulting in a reaction product comprising approximately 30% weight solids and 70% weight solvent, the solvent having a cresylic acid to diluent ratio of 60 to 40.

The resultant polymer solution was then applied to a bare copper conductor having no insulation thereon employing dies and a conventional wire coating tower at 36 feet per minute, having temperatures of 620° F., 800° F., and 850° F., respectively. Six coats were applied in this manner. The properties of the resultant magnet wire are shown in Table I.

Polymers made in accordance with Examples 1 and 7 hereinabove were tested in accordance with the "relative thermal stability" test procedure above mentioned. These data on a THEIC modified polyester polymer; a THEIC modified polyamide-imide ester of U.S. Pat. No. 3,555,113; an amide-imide polymer and an isocyanate modified polyethylene terephthalate polymer are all shown in FIG. 1. These data show that the polymer of the invention made in accordance with the examples herein compares favorably with the polyamide-imide-ester polymer of U.S. Pat. No. 3,555,113 and the polyester-amide-imide polymer made in accordance with Example 7, even though the polymer of the invention is considerably less expensive to manufacture and apply than the polymer of U.S. Pat. No. 3,555,113 and still significantly less expensive to manufacture and apply than the polymer of Example 7 and is water soluble.

Similarly, with reference to Table I, it is shown that each of the polymers of the invention compare favorably with the polyester-amide-imide of Example 6 and the polyester-amide-imide of Example 7. In fact, the polymers of the invention have by and large superior thermal properties and "burn out" resistance to the thermal properties and "burn out" resistance of the polyester-amide-imide polymer of U.S. Pat. No. 3,793,250 as indicated by NEMA "OFM", and improved resistance to thermal stress and overloads.

The polymers of the invention further have a high surface hardness and can be applied in a rapid manner, at a lower cost than, but otherwise completely comparable to conventional wire enamels comprising polymers having a plurality of ester, amide, imide groups therein. The polymers of an invention also have a higher cure rate than other water based wire enamels.

Thus, by the invention, an improved polymer has been provided. The polymer of the invention has higher and more reliable thermal life, and increased resistance to thermal overloads, and at the same time all required mechanical, physical, chemical and electrical properties required for most of the uses as insulation material. Additionally, the improved polymer can be applied to substrates using conventional machinery in a rapid manner and is less costly than comparable prior art insulation materials. The improved polymer has a plurality of amide, imide and ester groups therein and a unique balance by which the thermal properties are enhanced, the flexibility of the polymer is not deteriously effected, and none of the physical, mechanical, electrical or chemical properties of conventional polyester, polyamide, or polyimide materials are detracted from. Further, the improved polymer of the invention is soluble in water and can be applied from aqueous solutions. The method of the invention provides an improved method of making the polymer of the invention and an improved method of applying the same to substrates.

While there has been described above the principles of this invention in connection with specific chemistry, it is to be clearly understood that this description is made only by way of example and not as a limitation to the scope of the invention.

What is claimed is:

1. An essentially linear and water soluble resin having a plurality of amide, imide and ester groups therein and the physical, mechanical, chemical and electrical properties of a magnet wire insulation material comprising the condensation product having an acid number greater than about 10 of at least one polycarboxylic acid five member ring forming reactant, at least one ethylenicaly unsaturated polycarboxylic acid five or six member carboxy pyrrolidone ring forming reactant, at least one polyfunctional amino five or six member ring forming reactant, at least one glycol, at least one other polyfunctional hydroxyl compound, at least one carboxylic acid ester reactant chosen from the group consisting of the acids, esters, alkyl esters, and anhydrides of terephthalic, isophthalic, phthalic and benzophenone dicarboxylic acids, and combinations thereof, the equivalent molar ratio of the functional hydroxyl groups of the glycols and hydroxyl compounds to the functional ester-forming carboxyl groups of said acid reactants being greater than about 1.0 to 1, the equivalent molar ratio of the functional imide-forming groups of the acid reactants and said polyfunctional amino reactants to the functional carboxypyrrolidone-forming groups of the ethylenically unsaturated acids and polyfunctional amino reactants being greater than about 0.5 to 1 and less than about 3.0 to 1, the equivalent molar ratio of the functional imide-forming and carboxypyrrolidone-forming groups to the ester-forming groups being greater than about 0.2 to 1 and less than about 1.0 to 1.

2. The resin of claim 1 wherein said polycarboxylic acid five member ring forming reactant is chosen from the group consisting of tricarboxylic and tetracarboxylic acids, the anhydrides thereof, and combinations of the same.

3. The resin of claim 1 wherein said polycarboxylic acid five member ring forming reactant is chosen from the group consisting of trimellitic; pyromellitic; 2, 3, 6, 7 naphthalene tetracarboxylic benzophenone; 2, 3, 2', 3' tetracarboxylic; and 3, 3', 4, 4' diphenyl tetracarboxylic acids, the anhydrides of said acids and combinations thereof.

4. The resin of claim 1 wherein said ethylenically unsaturated reactant is chosen from the group consisting of itaconic acid, aconitic acid and combinations thereof.

5. The resin of claim 1 wherein said polyfunctional hydroxyl compound is chosen from the group consisting of ethylene glycol, glycerin, pentaerythrytol, 1, 1, 1 trimethylol ethane, 1, 1, 1 trimethylol propane, zorbitol, manitol, dipentaerythritol, and $\alpha$, $\omega$ aliphatic hydrocarbon diols having four to five carbon atoms; cyclic glycols; hydroquinone dibetahydroxy ethyl ether; 1, 4 cyclohexane dimethylol; polyethylene glycol; polytetramethylene oxide glycol, and combinations thereof.

6. The resin of claim 1 wherein said equivalent molar ratio of said hydroxyl groups to said ester-forming groups is from about 1.1 to 1 to about 2.0 to 1.

TABLE I

| | Properties of Polymers of Example I through 6 Applied to a 18 AWG Bare Copper Conductor | | | | | | |
|---|---|---|---|---|---|---|---|
| Example | 1 | 2 | 3 | 4 | 5 | 6 | 7 |
| Surface Rating | 1.1 | 1.1 | 1.1 | 1.1 | 1.1 | 1.6 | 1.1 |
| Build | 2.9–3.1 | 3.0–3.2 | 3.2–3.4 | 2.9–3.2 | 3.2–3.4 | 3.3–3.4 | 3.0–3.1 |
| Mandrel Flex | OK-BP | OK-BP | OK-BP | OK-BP | OK-BP | OK-BP | OK-BP |
| Snap/Snap Flex | OK-OK 2X | OK-OK 1X | OK-OK 1X | OK-OK 1X | OK-OK 1X | OK-OK 1X | OK-OK 1X |
| Heat Shock | Pass 175° C. | Pass 175° C. | Pass 200° C. | Pass 175° C. | Pass 200° C. | Pass 200° C. | Pass 175° C. |
| Techrand OFM | 10.14 | 11.99 | 12.40 | 10.00 | 12.25 | 9.17 | 11.99 |
| NEMA Cut-Thru (°C.) | 296 | 283 | 267 | 267 | 255 | 289 | 290 |
| Dielectric Breakdown | 11,550 V | 14,750 V | 13,000 V | 12,733 V | 13,750 V | 10,733 V | 12,933 V |

7. The resin of claim 1 wherein said equivalent molar ratio of said imide-forming to carboxypyrrolidone-forming groups is from about 1.1 to 1 to about 2.5 to 1.

8. The resin of claim 1 wherein said equivalent molar ratio of said imide-forming and carboxypyrrolidone-forming groups to said ester-forming groups is from about 0.26 to 1 to about 0.5 to 1.

9. The resin of claim 8 wherein said equivalent molar ratio of said hydroxyl groups to said ester-forming groups is from about 1.20 to 1 to about 1.40 to 1.

10. The resin of claim 9 wherein said equivalent molar ratio of said imide-forming groups to carboxypyrrolidone-forming groups is about 2 to 1, and said equivalent molar ratio of said imide and carboxypyrrolidone-forming groups to said ester-forming groups is about 0.4 to 1.

11. The resin of claim 10 comprising essentially the condensation product of trimellitic acid anhydride, itaconic acid, methylene dianiline, ethylene glycol, 1, 1, 1 trimethylol propane, phthalic anhydride and dimethyl isophthalate.

12. A method of forming a water soluble polymer having reoccuring amide, imide and ester groups therein comprising the steps of placing in a solvent for said polymer at least one glycol, at least one polyfunctional hydroxyl compound, and at least one carboxylic acid ester reactant chosen from the group consisting of the acids, esters, alkyl esters, and anhydrides of terephthalic, isophthalic, and benzophenone dicarboxylic acids, reacting said glycol and hydroxyl compound and carboxylic ester-forming reactant thereby forming a solution of a reaction product, placing in said solution at least one polycarboxylic acid five member ring-forming reactant, at least one ethylenically unsaturated polycarboxylic acid five or six member carboxypyrrolidone ring-forming reactant, at least one polyfunctional amino five or six member ring-forming reactant, the equivalent molar ratio of the functional hydroxyl groups of said glycols and hydroxyl compounds to the functional ester-forming carboxyl groups of said acid reactants being greater than about 1.0 to 1, the equivalent molar ratio of the functional imide-forming groups of said polycarboxylic acid five member ring forming reactant and said polyfunctional amino reactants to the functional carboxypyrroliodone-forming groups of said ethlenically unsaturated acids and polyfunctional amino reactants being greater than about 0.5 to 1 and less than about 3.0 to 1, the equivalent molar ratio of said functional imide-forming and carboxypyrrolidone-forming groups to said functional ester-forming groups being greater than about 0.2 to 1 and less than bout 1.0 to 1, thereby forming a reaction mixture, reacting said mixture thereby to form a polymer solution, the polymer of said polymer solution having an acid number greater than about 10.

13. The method of claim 12 wherein said ratio of said imide-forming and carboxypyrrolidone-forming groups to said ester-forming groups is from about 0.26 to 1 to about 0.5 to 1, said ratio of said hydroxyl groups to said ester-forming groups is from about 1.20 to 1 to about 1.40 to 1, and said ratio of said imide-forming groups to carboxypyrrolidone-forming groups is about 2 to 1.

14. The resin of claim 5, wherein said aliphatic hydrocarbon diols having four to five carbon atoms are chosen from the group consisting of 1, 4 butane diol; 1, 5 pentane glycol; neopentylene glycol; (1, 4 butene-2-diol) propylene glycol; and wherein said cyclic glycols are chosen from the group consisting of 2, 2, 4, 4, tetramethyl 1, 3 cyclobutane diol and tris (2 hydroxy ethyl) isocyanurate.

15. The method of claim 12 wherein both of said reacting steps are accomplished at atmospheric pressure and a temperature from about 100° C. to about 300° C.

16. The method of claim 12 wherein said polymer has an acid number of from about 10 to about 200.

17. The method of claim 16 wherein said polymer has an acid number of from about 20 to about 100 and said reacting steps are accomplished at atmospheric pressure and a temperature from about 130° C. to about 225° C.

18. The method of claim 16 further comprising the steps of diluting said polymer solution with water and a volatile base, adding a curing catalyst to said polymer solution applying said polymer solution to a substrate, and removing the solvent therefrom.

19. The method of claim 18 wherein said volatile base is chosen from the group consisting of ammonia, ammonium hydroxide, aliphatic amines having less than 7 carbon atoms, and combinations thereof.

20. The method of claim 18 wherein said polymer solution after said diluting step is from about 30% to about 40% weight polymer.

* * * * *